(12) United States Patent
Han et al.

(10) Patent No.: US 11,507,461 B2
(45) Date of Patent: Nov. 22, 2022

(54) METHOD, APPARATUS, AND COMPUTER READABLE MEDIUM FOR I/O CONTROL

(71) Applicant: EMC IP Holding Company LLC, Hopkinton, MA (US)

(72) Inventors: Geng Han, Beijing (CN); Jianbin Kang, Beijing (CN); Jibing Dong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 4 days.

(21) Appl. No.: 16/587,970

(22) Filed: Sep. 30, 2019

(65) Prior Publication Data

US 2020/0133779 A1 Apr. 30, 2020

(30) Foreign Application Priority Data

Oct. 30, 2018 (CN) .......................... 201811280028.X

(51) Int. Cl.
*G06F 11/10* (2006.01)
*G06F 11/30* (2006.01)
*G06F 11/20* (2006.01)
*G06F 3/06* (2006.01)

(52) U.S. Cl.
CPC ........ *G06F 11/1096* (2013.01); *G06F 3/0611* (2013.01); *G06F 3/0653* (2013.01); *G06F 3/0659* (2013.01); *G06F 3/0689* (2013.01); *G06F 11/2094* (2013.01); *G06F 11/3034* (2013.01)

(58) Field of Classification Search
CPC ............ G06F 11/1096; G06F 11/3034; G06F 11/2094; G06F 3/0659; G06F 3/0689; G06F 3/0653; G06F 3/0611; G06F 11/2058; G06F 11/2087; G06F 3/0644
See application file for complete search history.

(56) References Cited

U.S. PATENT DOCUMENTS

| 7,047,358 | B2 | 5/2006 | Lee et al. |
| 7,711,897 | B1 | 5/2010 | Chatterjee et al. |
| 7,970,994 | B2 | 6/2011 | Wack |
| 8,032,782 | B2 | 10/2011 | He et al. |
| 8,839,028 | B1 * | 9/2014 | Polia ................... G06F 11/1088 714/6.24 |
| 9,081,690 | B2 | 7/2015 | Araki et al. |
| 9,256,381 | B1 | 2/2016 | Fultz et al. |

(Continued)

*Primary Examiner* — David Yi
*Assistant Examiner* — Alan Otto
(74) *Attorney, Agent, or Firm* — BainwoodHuang

(57) ABSTRACT

Techniques providing I/O control involve: in response to receiving an I/O request, detecting a first set bits for a stripe in a RAID. The RAID is built on disk slices divided from disks. The stripes include extents. Each of the first set bits indicates whether a disk slice where a corresponding extent in the stripe is located is in a failure state. The techniques further involve determining, from the stripe and based on the first set bits, a first set of extents in the failure state and a second set of extents out of the failure state. The techniques further involve executing the I/O request on the second set of extents without executing the I/O request on the first set of extents. Such techniques can simplify storage bits in I/O control, support the degraded stripe write request for the RAID and enhance performance executing the I/O control.

13 Claims, 10 Drawing Sheets

(56) References Cited

U.S. PATENT DOCUMENTS

2007/0294565 A1* 12/2007 Johnston ............. G06F 11/1076
714/6.12
2016/0306574 A1* 10/2016 Friedman .............. G06F 3/0638
2017/0300393 A1* 10/2017 Sreedhar M ........ G06F 11/1076

* cited by examiner

METHOD, APPARATUS, AND COMPUTER READABLE MEDIUM FOR I/O CONTROL

CROSS-REFERENCE TO RELATED APPLICATION

This application claims priority to Chinese Patent Application No. CN201811280028.X, on file at the China National Intellectual Property Administration (CNIPA), having a filing date of Oct. 30, 2018, and having "METHOD, APPARATUS, AND COMPUTER READABLE MEDIUM FOR I/O CONTROL" as a title, the contents and teachings of which are herein incorporated by reference in their entirety.

FIELD

Embodiments of the present disclosure relate to the field of data storage, and more specifically, to method, apparatus, and computer readable medium for I/O control.

BACKGROUND

Redundant Array of Independent Disks (RAID) is a data storage virtualization technology, which can build one or more RAID on a plurality of physical storage disks to provide various characteristics, such as data redundancy, performance improvement and the like. Some traditional RAIDs write data uniformly at the level of disks, but such system may have defects in various aspects, e.g., disk management and I/O control etc. A new RAID technology has been proposed along with the development of RAID technology, and this technology executes data read and write at the level of disk slices instead of at the level of disks. In accordance with such technology, each of a plurality of disks is divided into a plurality of disk slices. Each stripe of the RAID built based on these disk slices is allocated with a certain number of extents, and the extents included in all stripes of the RAID are evenly distributed over the plurality of disk slices. By creating RAIDs in disk slices, more flexible data management and I/O control is implemented and running performance of the system is improved. Despite the constant development of the RAID technology, however, a more optimized I/O control solution in RAID is still desirable.

SUMMARY

Embodiments of the present disclosure provide an improved solution for I/O control.

In a first aspect of the present disclosure, there is provided a method for I/O control. The method includes: in response to receiving an I/O request, detecting a first set of information bits for a stripe in a Redundant Array of Independent Disks (RAID) related to the I/O request, the RAID being built on a plurality of disk slices divided from a plurality of disks, the stripe including a plurality of disks, and each of the first set of information bits indicating whether a disk slice where a corresponding extent in the stripe is located is in a failure state; determining, from the stripe and based on the first set of information bits, a first set of extents in the failure state and a second set of extents out of the failure state in the stripe; and executing the I/O request on the second set of extents without executing the I/O request on the first set of extents.

In a second aspect of the present disclosure, there is provided an apparatus for I/O control. The apparatus includes a processor; and a memory coupled to the processor and having instructions stored thereon, the instructions, when executed by a processor, causing the apparatus to perform acts including: in response to receiving an I/O request, detecting a first set of information bits for a stripe in a Redundant Array of Independent Disks (RAID) related to the I/O request, the RAID being built on a plurality of disk slices divided from a plurality of disks, the stripe including a plurality of disks, and each of the first set of information bits indicating whether a disk slice where a corresponding extent in the stripe is located is in a failure state; determining, from the stripe and based on the first set of information bits, a first set of extents in the failure state and a second set of extents out of the failure state in the stripe; and executing the I/O request on the second set of extents without executing the I/O request on the first set of extents.

In a third aspect of the present disclosure, there is provided a computer-readable medium having computer-readable instructions stored thereon, the computer-readable instructions, when executed, causing a device to: in response to receiving an I/O request, detect a first set of information bits for a stripe in a Redundant Array of Independent Disks (RAID) related to the I/O request, the RAID being built on a plurality of disk slices divided from a plurality of disks, the stripe including a plurality of disks, and each of the first set of information bits indicating whether a disk slice where a corresponding extent in the stripe is located is in a failure state; determine, from the stripe and based on the first set of information bits, a first set of extents in the failure state and a second set of extents out of the failure state; and execute the I/O request on the second set of extents without executing the I/O request on the first set of extents.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, advantages and features of the present disclosure will become more apparent through the detailed description of example embodiments of the present disclosure with reference to the accompanying drawings, where the like reference signs generally refer to the like elements in the example embodiments of the present disclosure.

DETAILED DESCRIPTION OF EMBODIMENTS

Figure 1:
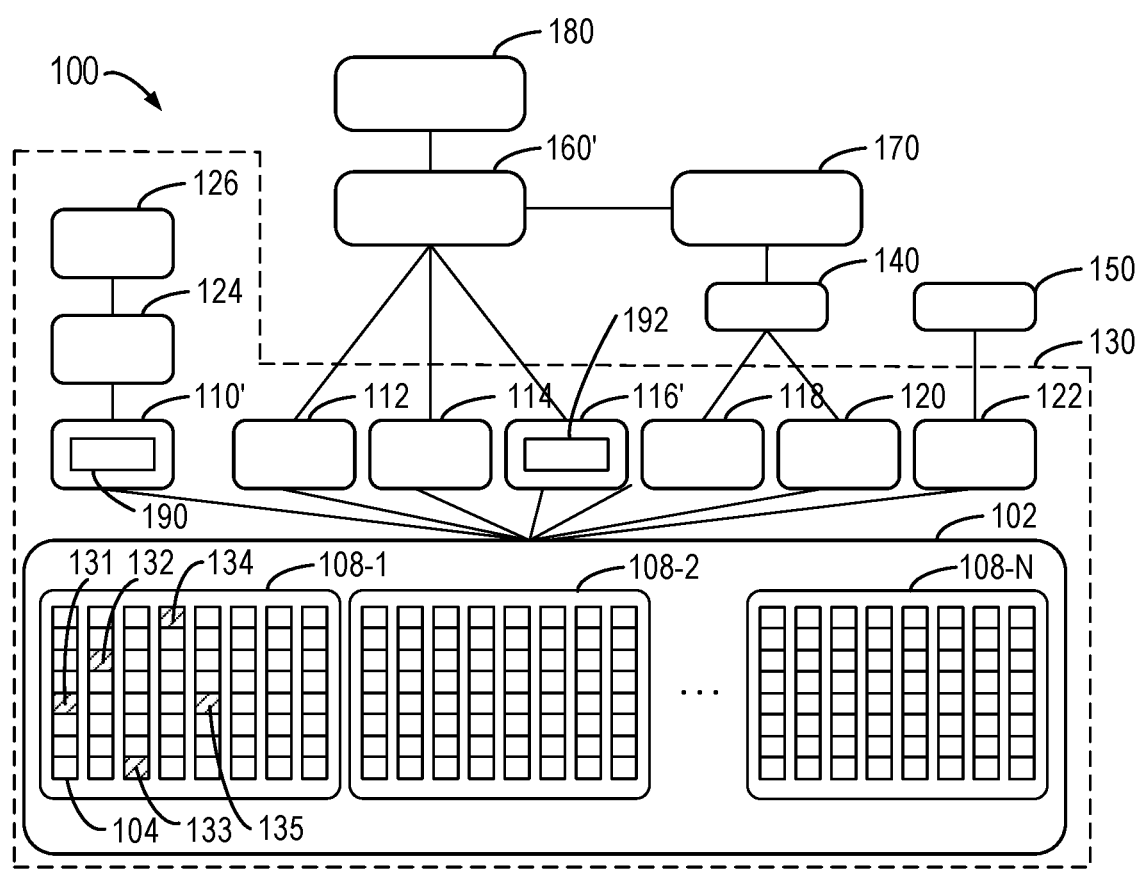
FIG. 1 illustrates a schematic diagram of a traditional architecture for operating a storage system.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles of the present disclosure will now be described with reference to several example embodiments illustrated in the drawings. Although some preferred embodiments of the present disclosure are shown in the drawings, it would be appreciated that description of those embodiments is merely for the purpose of enabling those skilled in the art to better understand and further implement the present disclosure and is not intended for limiting the scope disclosed herein in any manner.

As used herein, the term "include" and its variants are to be read as open-ended terms that mean "include, but is not limited to." The term "or" is to be read as "and/or" unless explicitly being defined otherwise. The term "based on" is to be read as "based at least in part on." The terms "an example embodiment" and "an embodiment" are to be read as "at least one example embodiment." The term "further embodiment" is to be read as "at least one further embodiment." The terms "first" and "second" can represent different objects or the same object. Other definitions, either explicit or implicit, may be included below.

The RAID technology described herein is established on a plurality of disk slices divided from a plurality of disks, wherein each disk is composed of a plurality of disk slices. An I/O request for the RAID is executed across a plurality of disk slices in the RAID in the form of stripes. A stripe includes a plurality of extents, wherein different extents are located on different disk slices. The I/O request executed across one stripe (including one respective extent in each disk slice) of all disk slices in the RAID can be referred to as a full-stripe I/O request, which indicates that the I/O request is executed for all disk slices in the RAID. In other cases, the I/O request executed across one stripe of a part of the disk slices in the RAID can be referred to as a degraded stripe I/O request, which means that this I/O request is executed on a part of the disk slices in the RAID.

FIG. 1 illustrates a schematic diagram of traditional architecture 100 for operating a storage system. The architecture 100 includes a storage system 130, a logger 140, a configuration debugging tool 150, a mapper 160', a cache 170 and a namespace 180.

The storage system 130 is stored with user data and provides an I/O interface for other components (such as the mapper 160', the logger 140 and the configuration debugging tool 150 in FIG. 1) in the architecture 100. A bottom tier of the storage system 130 is a slice pool 102, which manages all disks in the storage system 130. Disks in the slice pool 120 are indicated by the reference sign 104 in FIG. 1. Each disk 104 is divided into a plurality of disk slices of a fixed size. FIG. 1 illustrates that one disk 104 contains eight disk slices only for the purpose of clarity. In addition, one disk 104 may contain other number of disk slices in some implementations. In some implementations, the size of each disk slice is 4 GB.

Respective disks 104 in the slice pool 102 are grouped into different RAID Resilience Sets (RRS) 108-1, 108-2 . . . . 108-N (for the purpose of simplification, each RRS is collectively or respectively known as RRS 108 below). In the text, the RRS is used to include a limited number of disks 104 such that when disks in the RRS fail, the I/O request is executed by reallocating new disks (or disk slices) from this RRS instead of from other RRS. Accordingly, the failure of disks in one RRS would not affect the reliability of disks in other RRS. In some implementations, one RRS at most includes 25 disks 104. In some implementations, the number of RRS can vary in accordance with the requirements of I/O control/data scale and each RRS may also contain a different number of disks 104.

Upon receiving an I/O request from a host, the mapper 160' maps a logical address space in the namespace 180 to a physical address space of the disks 104 in the slice pool 102 using the RAID algorithm. However, the mapper 160' executes the I/O request at the level of disk slice rather than the level of disk 104, which is distinguished from the traditional RAID technology. As an example, the mapper 160' creates a 4+1 RAID 5 in the slice pool 102. It is known that the 4+1 RAID 5, similar to the disk-based RAID, represents that the I/O request is substantially evenly distributed on the five disk slices, wherein four disk slices in a full stripe store user data and a further one in the full stripe stores parity bit. On this occasion, the mapper 160' allocates one available disk slice respectively from five different disks 104 in the slice pool 102 to form a RAID, and executes the I/O request within the scope of the five disk slices based on the RAID algorithm. In some implementations, it is also specified that a plurality of disk slices in one RAID must come from the same RRS 108, so as to meet the reliability requirement of disks in the RRS. As an example, five disk slices 131, 132, 133, 134 and 135 forming one RAID in the RRS 108-1 are indicated by shadow in FIG. 1. It can be seen that each disk slice in the disk slices 131 to 135 is distributed on different disks 104 of the RRS 108-1. In some implementations, two different disk slices of the disk slices 131 to 135 can be distributed on the same disk 104.

In the disk slice-based RAID, the storage space can be reallocated in the dimension of disk slice without disabling the entire disk 104 when a failure occurs. For example, when the disk slice 132 is a failure state, the I/O request can be executed by reallocating other disk slices in the respective disks 104 of the RRS.

During execution of the I/O request, RAIDs composed of a plurality of disk slices in the slice pool 102 are aggregated into some tiers for being read and/or called by other components in the architecture 100. The aggregated tiers include a boot tier 112, a mapper user data tier 114, a mapper metadata tier 116', a log user data tier 118, a log metadata tier 120 and a configuration debugging tool tier 122. Each of the tiers 112, 114, 116', 118, 120 and 122 is composed of a plurality of RAIDs. The plurality of RAIDs in the same tier are allocated based on the same RAID algorithm while the RAIDs in different tiers are allocated based on different RAID algorithms.

The boot tier 112, the mapper user data tier 114 and the mapper metadata tier 116' are read and/or called by the mapper 160' as shown in FIG. 1. The boot tier 112 stores critical configurations for the mapper 160', and the critical configurations are loaded on a booting path when the mapper 160' is initiated. In some implementations, for the purpose of data security, the RAID in the boot tier 112 can adopt a 3-Way Mirror RAID algorithm (3-Way Mirror RAID 1) to realize triple redundancy. The mapper user data tier 114 stores the user data and the RAID therein adopts a parity RAID algorithm (RAID 5 or RAID 6). In some implementations, the mapper user data tier 114 supports 4+1 RAID 5, 8+1 RAID 5 and 16+1 RAID 5. In some implementations, the mapper user data tier 114 supports 4+2 RAID 6, 8+2 RAID 6 and 16+2 RAID 6. It is known that x+y RAID x+y indicates that the I/O request is evenly distributed on the x+y disk slices, wherein the x disk slices in the full stripe store the user data while the further y disk slices in the full stripe store parity bits. In some implementations, other employed RAID algorithms can be determined in accordance with the number of disks 104 and the number of disk slices in the slice pool 102. The mapper metadata tier 116' stores metadata for mapping between logical address and physical address, such as B+ tree nodes. In some implementations, the mapper metadata tier 116' stores a set identification 192 indicating a position at which the mapper 160' reads the position information bit set from the RAID database tier 110' while executing the I/O request. In some implementations, the RAID in the mapper metadata tier 116' can employ a 2-Way Mirror RAID algorithm (2-Way Mirror RAID 1). It is known that the 3-Way Mirror RAID algorithm stores three redundant versions of the user data across three different disk slices (i.e., stores the same user data on three different disk slices to enhance data security) whereas the 2-Way Mirror RAID algorithm stores two redundant versions of the user data across two different disk slices.

Furthermore, the log user data tier 118 and the log metadata tier 120 are read and/or called by the logger 140. The logger 140 is further read and/or called by the cache 170 using an application programming interface, wherein the cache 170 provides transactional operating functions to the mapper 160'. When the mapper 160' executes a transaction which modifies some data pages, the cache 170 stores all present modifications via the logger 140 into a particular tier (which is log user data tier 118 and log metadata tier 120 in FIG. 1) of the storage system 130. Data page, in the text, is defined as the minimum unit when the mapper 160' executes the I/O request. In some implementations, the data page is 4 KB. In some implementations, in an effort to improve the cache performance, the log user tier 118 and the log metadata tier 120 can be stored in dedicated disks with similar performance to Dynamic Random Access Memory (DRAM), and the dedicated disks can be separately grouped into a dedicated RRS.

Additionally, the configuration debugging tool tier 122 is read and/or called by the configuration debugging tool 150 to record the I/O access log within a most recent time period, such that the technical staff may utilize the configuration debugging tool 150 to configure the system performance and to debug the errors occurred in the I/O operations.

In some implementations, based on the requirements of data security, any of the tiers 112, 114, 116', 118, 120 and 122 can select either the 3-Way Mirror RAID algorithm with higher security or the 2-Way Mirror RAID algorithm with lower security. In some implementations, any of the tiers 112, 114, 116', 118, 120 and 122 can be expanded as required. In other words, any of the tiers 112, 114, 116', 118, 120 and 122 can be added with new RAIDs as required.

Moreover, the storage system 130 further includes a RAID database tier 110', which is not directly called by other components external to the storage system 130. In some implementations, the RAID database tier 110' is called by the RAID database 124 in the storage system 130 and the RAID database 124 is further called by a task framework 126. The RAID database 124 and the task framework 126 are used for internal operations of the storage system 130. In some implementations, the RAID database tier 110' is composed of a single RAID only. In some implementations, the RAID database tier 110' stores position information 190, which includes position information bit sets for respective disk slices of the I/O request to be executed, and position information bit sets for the respective disk slices which once executed the I/O request. The position information bit set can indicate a specific disk slice in the RRS, such as the fifth disk slice in the third disk.

As described above, the mapper 160' maps the logical address space in the namespace 180 to the physical address space of a disk 104 in the slice pool 102 using the RAID algorithm. The mapper 160', as a single flat linear logical address space, is read and/or called by the namespace 180. In some implementations, the size of the single flat linear logical address space may as large as 8EB. The mapper 160' maintains the mapping between logical address and physical address using the B+ tree, and the minimum granularity (resolution) of the mapping is a 4 KB data page. As stated, the mapper 160' reads and/or calls data from the boot tier 112, the mapper user data tier 114 and the mapper metadata tier 116'. Upon receiving the I/O request, the mapper 160' executes, in accordance with the type of the I/O request (read request or write request), a corresponding read request or write request on the RAID in these tiers.

Specifically, if receiving a write request, the mapper 160' first aggregates sufficient 4 KB data pages into one 2 MB Physical Large Block (PLB) and then executes the write request on the RAIDs of the tiers in units of PLB. If receiving a read request, the mapper 160' can execute the read request in units of physical address smaller than or equal to 2 MB. In some implementations, each disk slice in the RAID is further divided into a plurality of extents, wherein each extent represents a minimum unit of the disk slice into which the data can be written in the write operation. In the implementation where PLB is 2 MB, the size of an extent may be 64 KB. Under such a circumstance, one PLB, after being successfully written, occupies eight full stripes in the case of 4+1 RAID architecture, and occupies four full stripes in the case of 8+1 RAID architecture.

It is noted that the above minimum mapping granularity of the mapper 160', the size of the PLB, the size of the extent and the RAID algorithm are by way of examples only. In fact, they can vary in accordance with application environment and configurations of a storage system.

The namespace 180 manages the flat linear logical space read and/or called from the mapper 160'. Besides, the cache 170 provides transactional operating functions to the mapper 160' to avoid data loss during data page modification, and the configuration debugging tool 150 records the I/O access log within a time period, such that the technical staff can configure the system performance and debug the errors occurred in the I/O operations as described above.

When the I/O request is executed on the RAID in the architecture 100 of FIG. 1 (e.g., by the mapper 160'), it is usually required to detect information of respective disk slices in the RAID, so as to determine positions of the respective disk slices and the state of each disk slice for the I/O request to be executed. When it is detected that the disk slice is in a normal state, the I/O request is executed normally; however, if it is detected that the disk slice is in an abnormal state, such as disk failure, read/write failure and incomplete rebuild or the like, new disk slices are allocated to the RAID in the RRS.

Figure 2A:
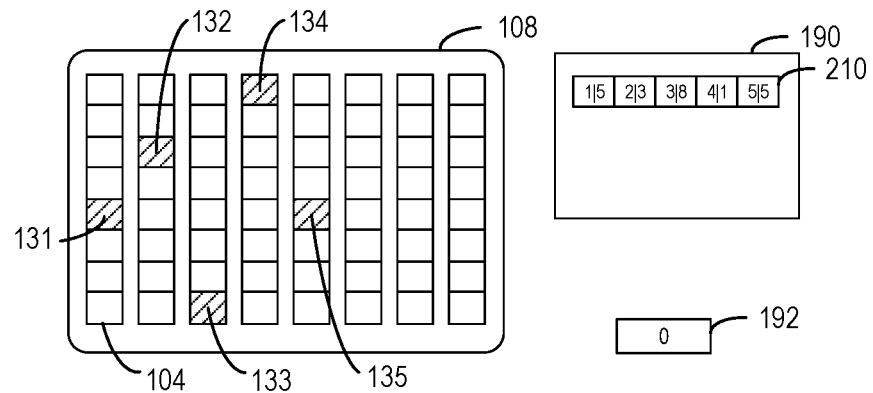
FIGS. 2A to 2C illustrate schematic diagrams of changes of position information and set identification when the disk slices of the respective disks in the RRS are in different states.
Figure 2B:
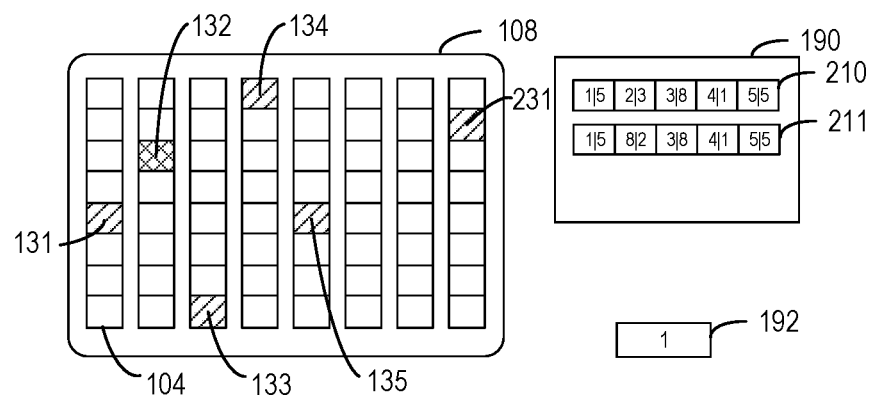
Figure 2C:
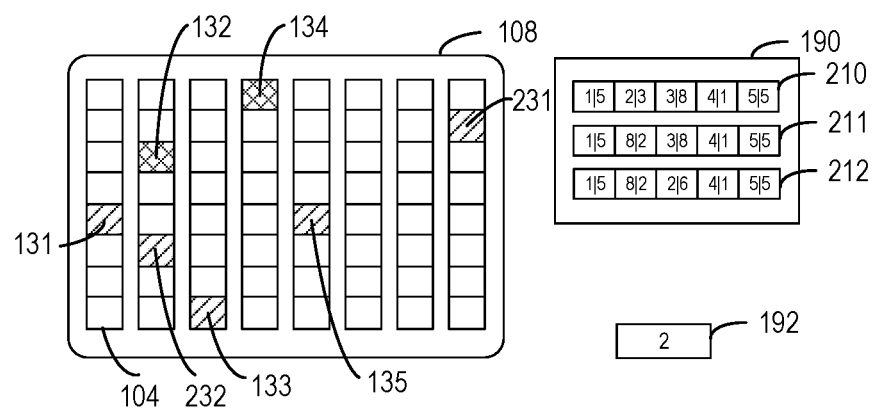

FIGS. 2A to 2C illustrate schematic diagrams of changes of position information 190 and set identification 192 when the disk slices of the respective disks in the RRS 108 are in different states.

FIG. 2A illustrates the initial RRS 108, the initial position information 190 of the RAID and the set identification 192 stored in the mapper metadata tier 116'. At this time, the respective disk slices 131 to 135 are in the normal state. The position information 190 includes a position information bit set 210 for the respective disk slices of the I/O request to be executed. Each information bit in the position information bit set 210 includes the position of the disk slice of the I/O request to be executed, for example, "115" represents the fifth disk slice of the first disk (i.e., disk slice 131). One position information set for the respective disk slices of the I/O request to be executed can be also referred to as a "plan" in the text. Every time a new disk slice is allocated, the mapper 160' generates a new position information bit set (i.e., generates a new plan) in the position information 190. In case there is a plurality of position information bit sets, the mapper 160', when executing the I/O request, reads the correct identification of the position information set from the set identification 192 to accurately perform the I/O request. In FIG. 2A, the mapper metadata tier 116' stores the set identification 192 with value "0," which means that the I/O request is executed on the position information bit set 210 with the identification "0." Based on the I/O information bit 192, the mapper 160' identifies the position information bit set 210 and executes the I/O request based on the identified position information bit set 210.

FIG. 2B illustrates that, it is impossible to continue executing the I/O request on the disk slice 132 due to its abnormal state. At this point, the mapper 160' immediately allocates a new disk slice 231 in the RRS to the RAID. In some implementations, the mapper 160' preferably allocates a new disk slice 231 from a different disk instead of the disk where the disk slice 132 is located. Then, the mapper 160' generates a new position information bit set 211, which is also included in the position information 190. The position information bit set 211, now with the identification "1," includes the position information of the new disk slice 231 and removes the position information of the disk slice 132 in the abnormal state. Thereafter, the mapper 160' issues a mapper metadata I/O request to modify the set identification 192, and then executes the I/O request according to the set identification 192 with value "1" stored in the mapper metadata tier 116'.

FIG. 2C further illustrates that a new disk slice 232 is allocated to the RAID in the RRS as the disk slice 134 is in an abnormal state. Similar to FIG. 2B, a new position information bit set 212 (identified as "2') is generated in the position information 190, and the position information bit set 212 includes the position information of the new disk slice 232 and removes the position information of the disk slice 134 in the abnormal state. In addition, the mapper then executes the I/O request according to the set identification 192 with value "2" stored in the mapper metadata tier 116'.

The solution shown in FIGS. 2A to 2C has many defects. First of all, when the mapper creates a new position information bit set, the old position information bit set is retained in the position information 190 rather than being replaced or removed. Therefore, a large amount of redundant information exists in the I/O control process, especially when the I/O control lasts for a long time. This will significantly affect the performance of the memory (such as the RAID database tier 110' shown in FIG. 1) which stores the position information 190. Moreover, it is required that a new disk slice is allocated when a disk slice is detected in an abnormal state in FIG. 2, such that the mapper can constantly execute the full stripe write request for the RAID. However, when the remaining disk slices in the RRS are all in the abnormal state, the mapper simply terminates the write request because the new position information bit set cannot be created at this moment. In other words, the mapper cannot perform degraded stripe write request for the RAID, i.e., it is impossible to execute the write request when the extents in the abnormal state exist in a stripe. The above situation can easily occur when the RRS contains a small amount of disks (e.g., less than or equal to 6), which reduces user-friendliness. Furthermore, when the new position information bit set is created, the mapper and the RAID require jointly rebuild data from the previous position information bit sets. In the meantime, the mapper must issue a mapper metadata write request to modify the set identification 192 in the mapper metadata (which is stored in the mapper metadata tier 116' shown in FIG. 1, for example), which significantly slows down the rebuild procedure.

Hence, there is a need for an improved solution for I/O control, which can simplify storage of information bits in the I/O control of the RAID, support the degraded stripe write request for the RAID, and enhance the performance of the processor executing the I/O control.

In accordance with some embodiments of the present disclosure, there is provided an improved solution for I/O control. In accordance with this solution, when it is detected that the disk slice of the I/O request to be executed is in a failure state, a new disk slice is not allocated immediately. Instead, the solution can continue to execute the degraded I/O request. Specifically, in response to receiving the I/O request, the first sets of information bits of the respective extents in the stripes related to the RAID are detected. Afterwards, different extents in failure state and out of the failure state are determined based on the first sets of information bits, and the I/O request is subsequently executed on the extents out of the failure state only. The improved solution can simplify storage of information bits in the I/O control and support the degraded stripe I/O request for the RAID.

Figure 3:
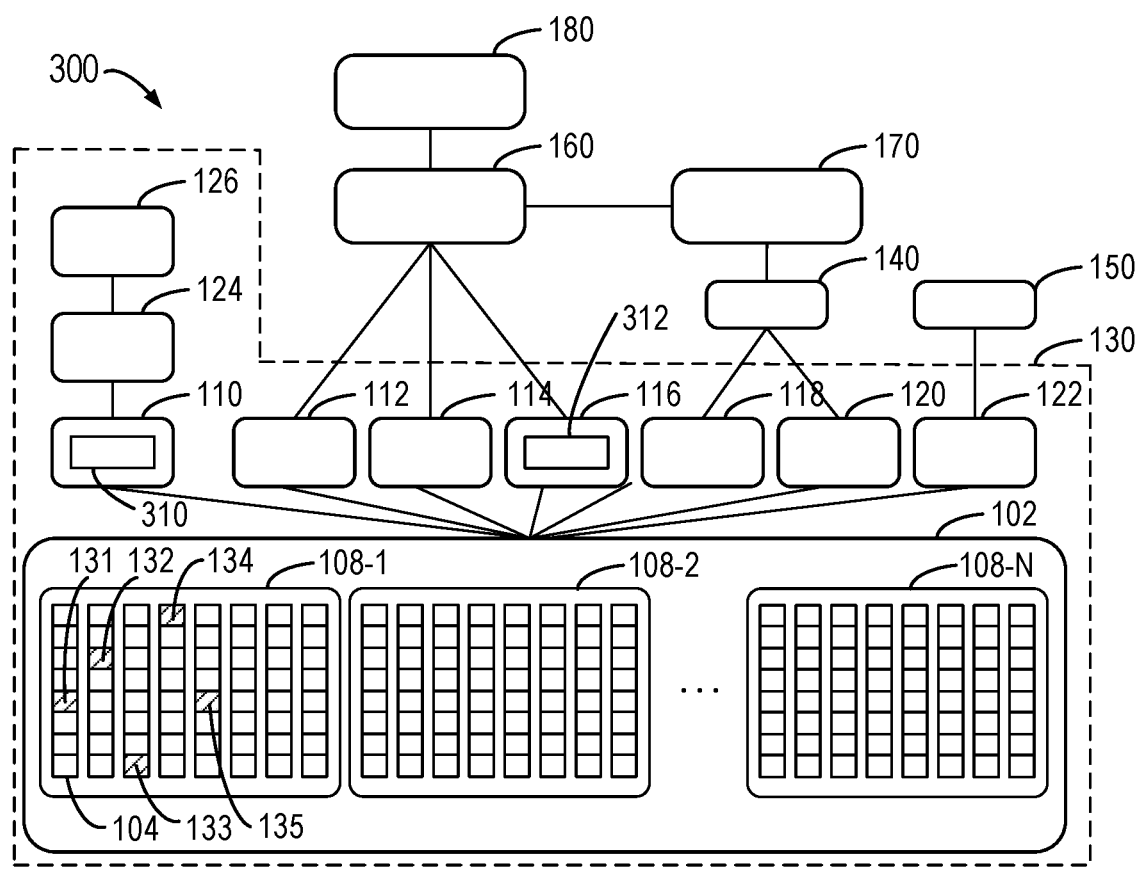
FIG. 3 illustrates a schematic diagram of architecture where embodiments of the present disclosure can be implemented.

FIG. 3 illustrates a schematic diagram of architecture 300 where embodiments of the present disclosure can be implemented. The architecture 300 of FIG. 3 differs from the architecture 100 of FIG. 1 in that, in the architecture 300, the RAID database tier 110 stores disk slice information 310, including one set of position information bits and multiple sets of state information bits. Before the mapper 160 executes the I/O request, the respective information bits in the disk slice information 310 are firstly detected and then the I/O request is executed based on the respective information bits. In some embodiments, the mapper metadata tier 116 stores a further set of state information bits 312 (known as second set of information bits 312 below). Apart from detecting the disk slice information 310, the mapper 160 also detects the second set of information bits 312. Other components of the architecture 300 are identical to the corresponding ones in the architecture 100 and will not be further described for the purpose of simplification.

The position information bit set in the disk slice information 310 includes position information for the respective disk slices of the I/O request to be executed in the RAID, and can have a similar form to the position information bit set 210 as shown in FIG. 2. The multiple sets of state information bits contain different state information for the respective disk slices of the I/O request to be executed in the RAID, indicating the states of the disk slices, such as a failure state, a new disk rebuild state, a rebuild state and the like. In some embodiments, the multiple sets of state information bits can include a first set of information bits, in which each information bit indicates whether one disk slice of the I/O request to be executed is in the failure state. In some embodiments, the multiple sets of state information bits can include a third set of information bits, in which each information bit indicates whether one disk slice of the I/O request to be executed is in the new disk rebuild state. In some embodiments, the multiple sets of state information bits also can include an optional fourth set of information bits, in which each information bit indicates whether one disk slice of the I/O request to be executed is in the rebuild state.

In the architecture 300, when detecting that the disk slice of the I/O request to be executed is in the failure state, the mapper 160, instead of allocating a new disk slice immediately, waits for a time period (e.g. five minutes) and then automatically allocates a new disk slice. During this time period, the mapper 160 updates the multiple sets of state information bits and executes the degraded stripe I/O request based on the multiple sets of state information bits. In some embodiments, each information bit in the multiple sets of state information bits can be represented by binary numbers "1" and "0."

A code definition of the disk slice information 310 in the architecture 300 is illustrated below as an example.

```
struct cyc_uber_mapping_dev_t
{
    cyc_u32_t disk_index        : 12;
    cyc_u32_t disk_extent_index : 20;
}
union cyc_uber_geometry_t
{
    cyc_uber_mapping_dev_t parity4plus1[4][4+1];    // 4 data disk slices, 1 parity bit disk slice
    cyc_uber_mapping_dev_t parity8plus1[2][8+1];    // 8 data disk slices, 1 parity bit disk slice
    cyc_uber_mapping_dev_t parity16plus1[1][16+1];  // 16 data disk slices, 1 parity bit disk slice
    cyc_uber_mapping_dev_t parity4plus2[4][4+2];    // 4 data disk slices, 2 parity bit disk slice
    cyc_uber_mapping_dev_t parity8plus2[2][8+2];    // 8 data disk slices, 2 parity bit disk slice
    cyc_uber_mapping_dev_t parity16plus2[1][16+2];  // 16 data disk slices, 2 parity bit disk slice
}
struct cyc_uber_info_t
{
    cyc_uber_geometry_t geo;
    uint32_t            rebuild_logging_bitmap;  // 1: disk slice in failure state, 0: disk slice out of failure state
    uint32_t            rebuild_bitmap;          // 1: disk slice in rebuild state
    uint32_t            newdisk_bitmap;          // 1: disk slice in new disk rebuild state
}
```

In the above example, in the Struct cyc_uber_mapping_dev_t, disk_index and disk extent index respectively define the maximum number of disks in the RRS and the maximum number of disk slices included in each disk. Then, positions of disk slices in the RAID of different architectures are defined in the form of a two-dimensional array in the Union cyc_uber_geometry_t. In this example, different RAID architecture can include 4+1 RAID 5, 8+1 RAID 5, 16+1 RAID 5, 4+2 RAID 6, 8+2 RAID 6 and 16+2 RAID 6 and the like. However, those skilled in the art can envisage other definitions with respect to the maximum number and the RAID architecture.

The Struct cyc_uber_info_t can correspond to the currently discussing disk slice information 310, including position information bit set geo (whose architecture depends on the definition in the Union cyc_uber_geometry_t), first set of information bits rebuild_logging_bitmap, fourth set of information bits rebuild_bitmap and third set of information bits newdisk_bitmap.

Figure 4:
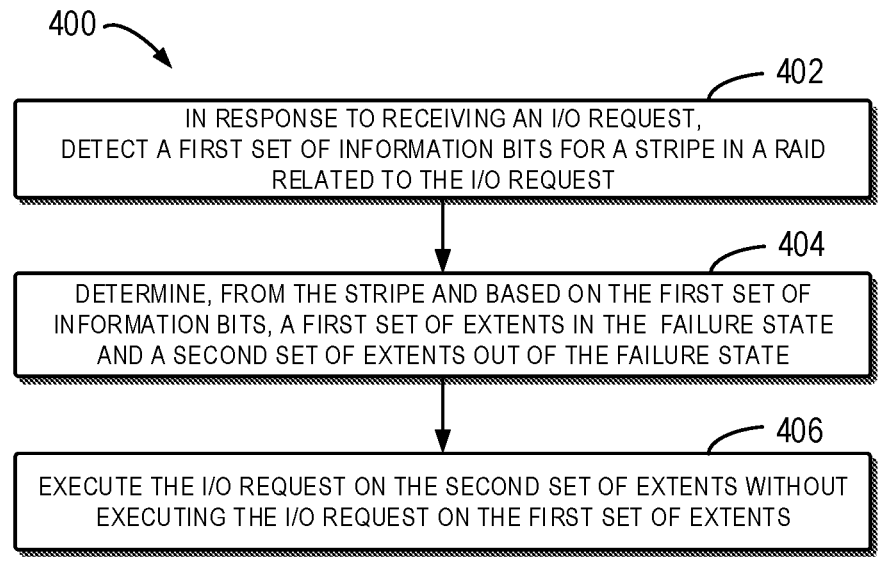
FIG. 4 illustrates a flowchart of a method for I/O control in accordance with embodiments of the present disclosure.

The use of the disk slice information 310 and the possible information bit set 312 during the I/O control process will be described in details below with reference to a flowchart. FIG. 4 illustrates a flowchart of a method 400 of the I/O control in accordance with embodiments of the present disclosure. The method can be executed by the mapper 160 in FIG. 3. To facilitate the description, the method 400 is described with reference to FIG. 3.

At block 402, in response to receiving an I/O request, the mapper 160 detects a first set of information bits for the stripes in the RAID related to the I/O request. As described above, the RAID is built based on the disk slices and the stripe is a set of extents across different disk slices in the RAID.

As stated, each of the first set of information bits indicates whether a disk slice where a corresponding extent in the stripe is located is in the failure state. In the text, a state when a disk slice fails and is not replaced yet is defined as the failure state. After the disk slice is replaced, the value of the information bit which previously indicated the failure state is changed (e.g., reversed), to demonstrate that the disk slice is out of the failure state. In some embodiments, if the disk slice is in the failure state, the mapper 160 cannot perform the I/O request on the disk slice normally. Specifically, when executing the I/O request, the mapper 160 cannot write data into the disk slice or read data from the disk slice.

Figure 5:
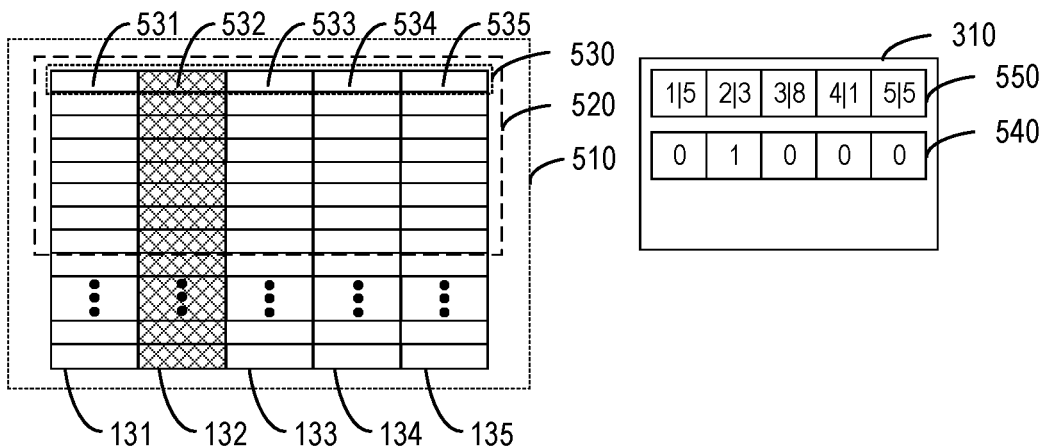
FIG. 5 illustrates a schematic diagram of the RAID of the I/O request to be executed and the disk slice information thereof in accordance with embodiments of the present disclosure.

FIG. 5 illustrates a schematic diagram of the RAID of the I/O request to be executed and the disk slice information thereof in accordance with embodiments of the present disclosure. It is shown in FIG. 5 that the disk slices 131 to 135 in FIG. 3 have already been combined into a RAID 510. Each disk slice is composed of a plurality of extents. One stripe 530 of the RAID 510 consists of extents 531, 532, 533, 534 and 535 across the disk slices 131 to 135. FIG. 5 also illustrates a stripe set 520 of an I/O request to be executed having a size of one PLB, the stripe set consisting of a plurality of stripes. As an example, it is assumed that the disk slice 132 is in the failure state while the disk slices 131, 133, 134 and 135 are out of the failure state. FIG. 5 further illustrates the disk slice information 310, which includes a first set of information bits 510 and the position information set 550 as described above. Under the states of the respective disk slices of the RAID 510 as shown in FIG. 5, the information bit of the first set of information bits 540 corresponding to the disk slice 132 indicates that the disk slice 132 where one extent 532 of the stripe 530 is located is in the failure state (e.g., indicated by value "1"). Other information bits of the first set of information bits 540 indicate that the disk slices 131, 133, 134 and 135 where other extents of the stripe 530 are located are out of the failure state (e.g., indicated by value "0").

Now return to FIG. 4. At block 404, the mapper 160 determines, from the stripe and based on the first set of information bits, a first set of extents in the failure state and a second set of extents out of the failure state. The first set of extents or the second set of extents can include one or more extents of the stripe depending on the particular indication of the first set of information bits. In the example of FIG. 5, the mapper 160 can determine, from the stripe 530 and based on the first set of information bits 540, a first set of extents 532 in the failure state and a second set of extents 531, 533, 534 and 535 out of the failure state.

At block 406, the mapper 160 executes the I/O request on the second set of extents without executing the I/O request on the first set of extents. Accordingly, the I/O request is executed only on the second set of extents out of the failure state, i.e., the degraded stripe I/O request can be implemented. This can be applied to both the degraded stripe write request and the degraded stripe read request. In terms of the example of FIG. 5, the mapper 160 executes the I/O request on the second set of extents 531, 533, 534 and 535 without executing the I/O request on the first set of extents 532.

The overall control process of the I/O request has been described above with reference to FIG. 4. The processing of the mapper 160 may vary for different cases of the I/O read request and the I/O write request, which will be discussed in the following text.

Figure 6:
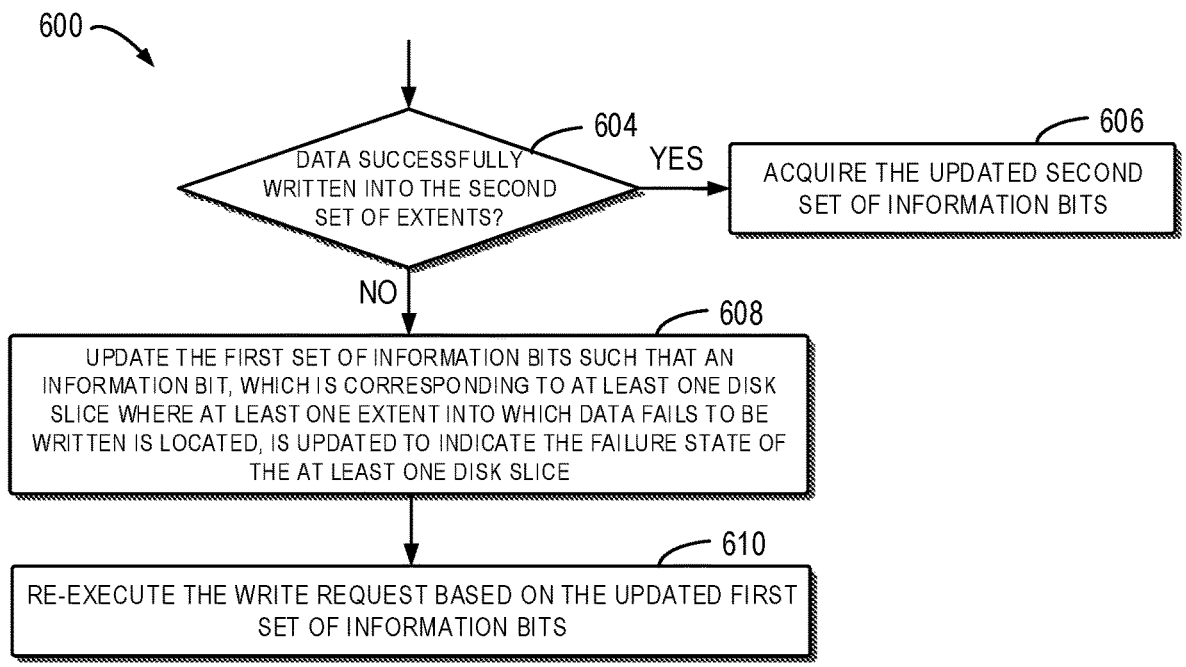
FIG. 6 illustrates a flowchart of a further method for I/O control when the I/O request is a write request in accordance with embodiments of the present disclosure.

FIG. 6 illustrates a flowchart of a further method 600 of the I/O control when the I/O request is a write request in accordance with embodiments of the present disclosure. The method 600 can be regarded as the subsequent process of the method 400 when the I/O request is a write request. Therefore, the method 600 also can be executed by the mapper 160 of FIG. 3. In order to facilitate understanding, the method 600 will also be described below with reference to FIGS. 7A to 7C. FIGS. 7A to 7D illustrate schematic diagrams of changes of the RAID, the disk slice information and the second set of information bits under the RAID structure of FIG. 5.

After the write request is executed on the second set of extents rather than the first set of extents, the mapper 160 detects whether the data associated with the write request is successfully written into the entire second set of extents at block 604. If it is determined at block 604 that the data fails to be written into at least one of the second set of extents, the method 600 proceeds to block 608; otherwise, the method 600 proceeds to block 606.

Figure 7A:
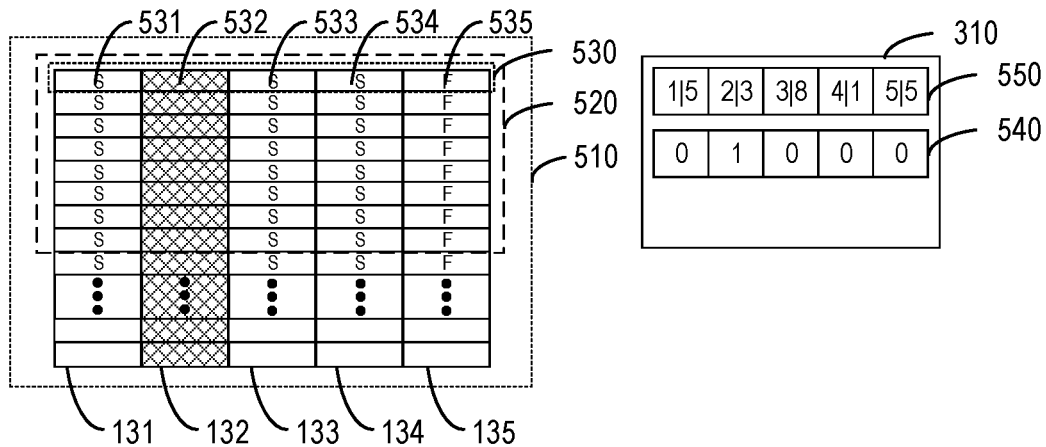
FIGS. 7A to 7D illustrate schematic diagrams of changes of the RAID, the disk slice information and the second set of information bits under the RAID structure of FIG. 5 in accordance with embodiments of the present disclosure.

FIG. 7A illustrates the case where the data associated with the write request fails to be written into at least one of the second set of extents 531, 533, 534 and 535. In this example, it is assumed that the disk slice 135, which was previously determined as out of the failure state, fails in the RAID 510. Accordingly, data associated with the write request cannot be successfully written into the extent 535, which is indicated as "F." The other extents 531, 533 and 534 are represented by "S."

At block 608, the mapper 160 updates the first set of information bits such that the information bits, which are corresponding to at least one disk slice where the at least extent into which data fails to be written is located, is updated to indicate the failure state of the at least one disk slice.

Figure 7B:
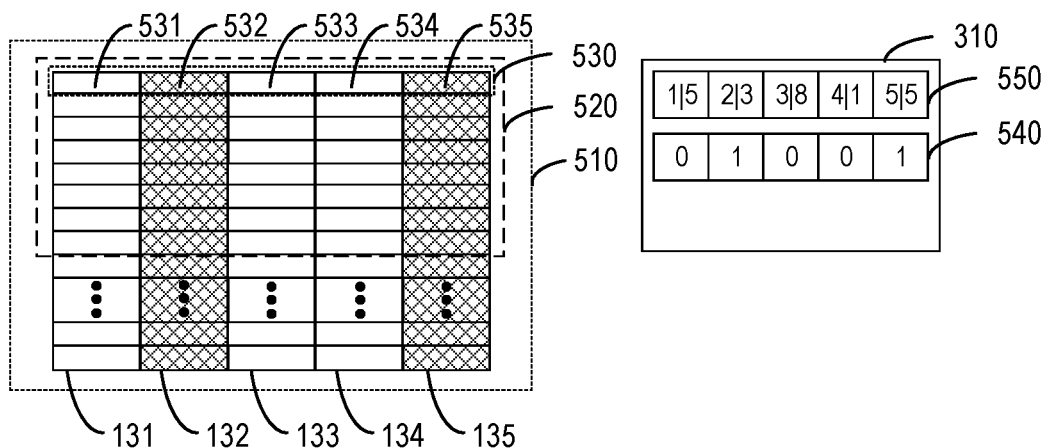

Such case is illustrated in FIG. 7B, wherein data fails to be written into the extent 535 of the second set of extents due to the failure of the disk slice 135 in FIG. 7A. Therefore, the mapper 160 updates the first set of information bits 540 such that the updated first set of information bits 540 indicates the failure state of the disk slice 135. At this moment, since the disk slice 132 still fails, the corresponding information bit in the first set of information bits 540 still indicates the failure state of the disk slice 132.

After updating the first set of information bits, the mapper 160 re-executes the write request based on the updated first set of information bits at block 610. Thus, the disk slice of the second set of extents where an extent to which the data fails to be written is located is updated to the failure state, and the write request will not be performed on this extent during re-execution of the write request. This can further avoid operations on the failure extent.

For example, when the write request is re-executed based on the updated first set of information bits 540 in FIG. 7B, the first set of extents 532 and 535 in the failure state and the second set of extents 531, 533 and 534 out of the failure state are re-determined in the stripe 530. Therefore, the write request is executed on the second set of extents 531, 533 and 534 without being executed on the first set of extents 532 and 535.

If it is determined, at block 604, that the data associated with the write request is successfully written into the entire second set of extents, the method 600 proceeds to block 606, at which the mapper 160 acquires the second set of information bits 312 updated by the RAID. The updated second set of information bits 312 indicate that all disk slices where the second set of extents are located include valid data, while the disk slices where the first set of extents on which the write request is not performed are located do not include valid data.

In the text, inclusion of valid data in the disk slice is defined as: data is successfully written into the disk slice during the write request. In other cases, the disk slice does not include valid data. For example, in the write request, since the disk slice has already been in the above failure state and no write request is executed on the disk slice, the disk slice does not include valid data. For another example, in the write request, although the mapper 160 has attempted to execute the write request on the disk slice, the write request fails as the disk slice is converted into the failure state and the disk slice accordingly does not include valid data. In some embodiments, each of the second set of information bits can also be represented by binary numbers "1" and "0."

In some embodiments, the second set of information bits updated by the RAID are returned to the mapper 160 after the mapper 160 completes executing the write operation, and the mapper 160, for example, can store the second set of information bits in the mapper metadata. In some embodiments, the mapper 160, when executing the read request, transfers the stored second set of information bits to the RAID, so as not to perform the read request on the disk slices without any valid data. In other words, contrary to the first set of information bits and the position information bit set, the mapper 160 only executes the degraded stripe I/O request based on the second set of information bits without modifying the values of the second set of information bits. Therefore, the mapper 160 does not need to parse or modify the value of the second set of information bits, and we call the second set of information bits as "opaque information" with respect to the mapper. This significantly improves the performance of the I/O request execution compared to the case where the mapper must issue a mapper metadata write request to modify the architecture 100 of the mapper metadata.

Figure 7C:
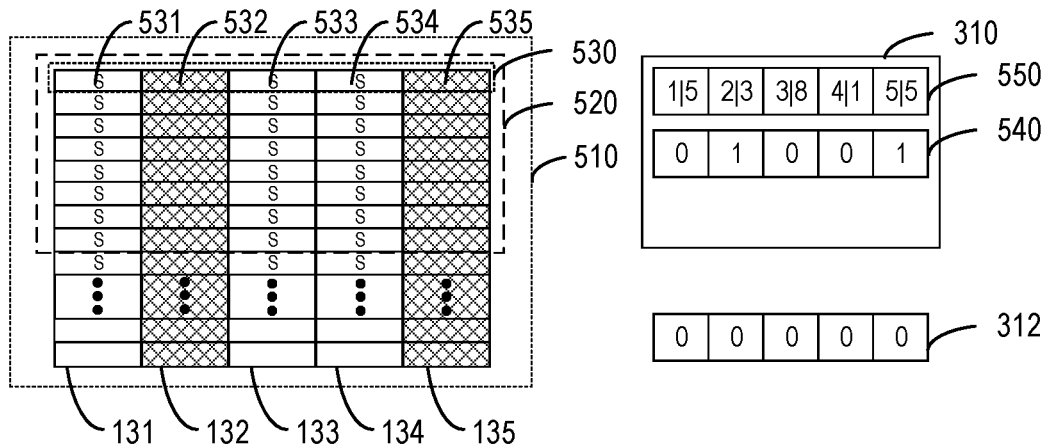
Figure 7D:
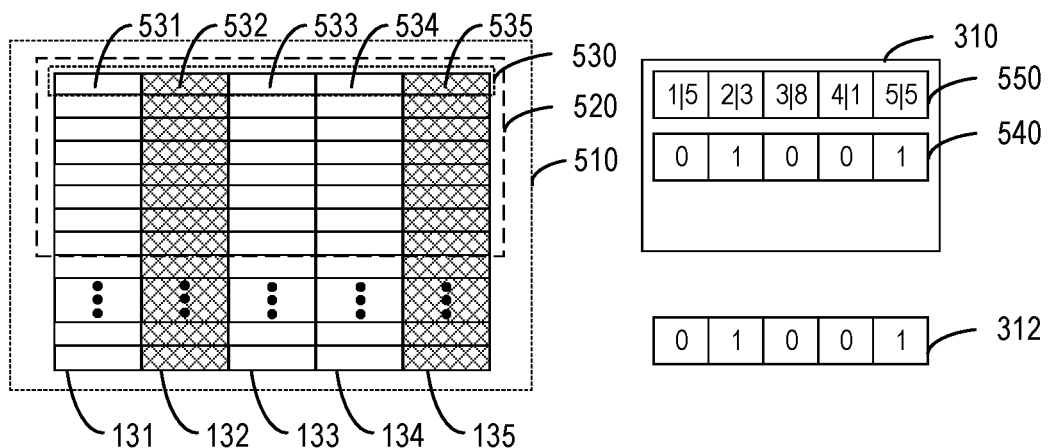

As mentioned above, the second set of information bits 312 are stored in the RAID database tier 110. FIGS. 7C and 7D schematically illustrate update of the second set of information bits 312 under different states of the disk slices of the RAID 510. In the example of FIG. 7C, all information bits in the second set of information bits 312 have "0" value, indicating that all disk slices 131 to 135 contain valid data after the execution of the previous write request on a certain stripe of the RAID. When a current write request is executed on the stripe 530, the data is successfully written into all extents 531, 533 and 534 located in the disk slices 131, 133 and 134 (e.g., indicated by "S") due to the failure of the disk slices 132 and 135. The write request is not executed on the disk slices 132 and 135 because they are identified to be in the failure state by the first set of information bits 540. For such case, data is written into all extents (i.e., data is successfully written into the extents 531, 533 and 534). Therefore, it is required that the RAID updates the information bits corresponding to the disk slices 132 and 135 in the second set of information bits 312 to "1," so as to indicate that the disk slices 132 and 135 do not include valid data as shown in FIG. 7D. In some embodiments, the RAID can return the second set of information bits 312 to the mapper after the mapper executes the write operation.

It can be seen that, the method 400 also avoids redundant storage of information bits by dynamically updating the information of the disk slices in the RAID, in addition to enable supporting the execution of the degraded stripe I/O request. In some preferred embodiments, when the I/O request is a write request, the method 400 which includes the method 600 can further ensure that the write request is executed on the disk slices out of the failure state only. Besides, the first set of information bits of the disk slices can be updated and the write request can be re-executed when the data fails to be written into the disk slice where the write request should be executed. Therefore, the reliability of executing the degraded stripe write request is further enhanced.

Figure 8A:
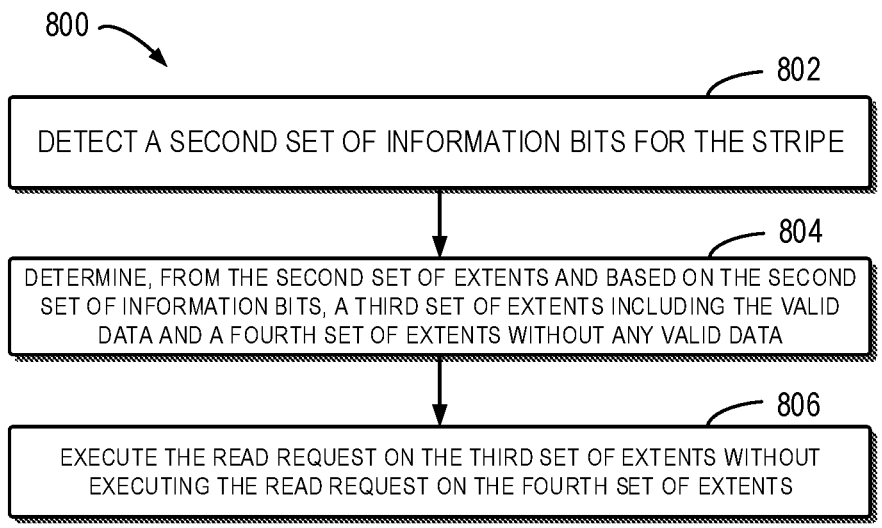
FIGS. 8A and 8B illustrate flowcharts of methods for executing an I/O request when it is a read request in accordance with embodiments of the present disclosure.
Figure 8B:
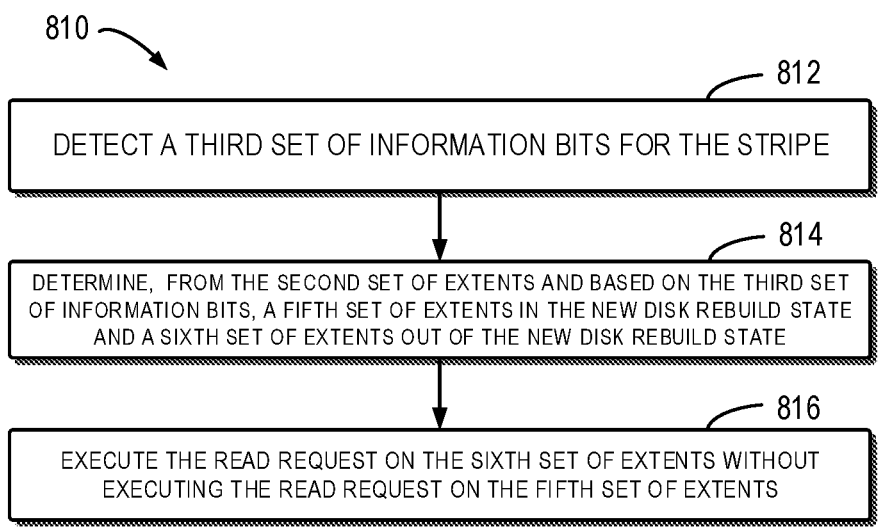

Now refer to FIGS. 8A and 8B, which respectively illustrate flowcharts of methods 800 and 810 for executing an I/O request when it is a read request in accordance with embodiments of the present disclosure. Specifically, the methods 800 and 810 correspond to two embodiments of the present disclosure which execute the read request on the second set of extents without executing the read request on the first set of extents when the I/O request is a read request.

The method 800 in FIG. 8A is introduced in the first place. The method 800 starts from block 802, at which the second set of information bits are detected for the stripe in the RAID related to the read request. As mentioned above, the second set of information bits indicate whether each disk slice in the RAID includes valid data. In some embodiments, the disk slices on which the write request preceding the current read request is not executed due to the failure state can be considered as without any valid data. In some embodiments, the disk slices into which the data associated with the write request preceding the current read request fails to be written can be considered as without any valid data. In some embodiments, the second set of information bits are determined based on whether the data associated with the write request preceding the current read request is successfully written into the disk slices.

Figure 9A:
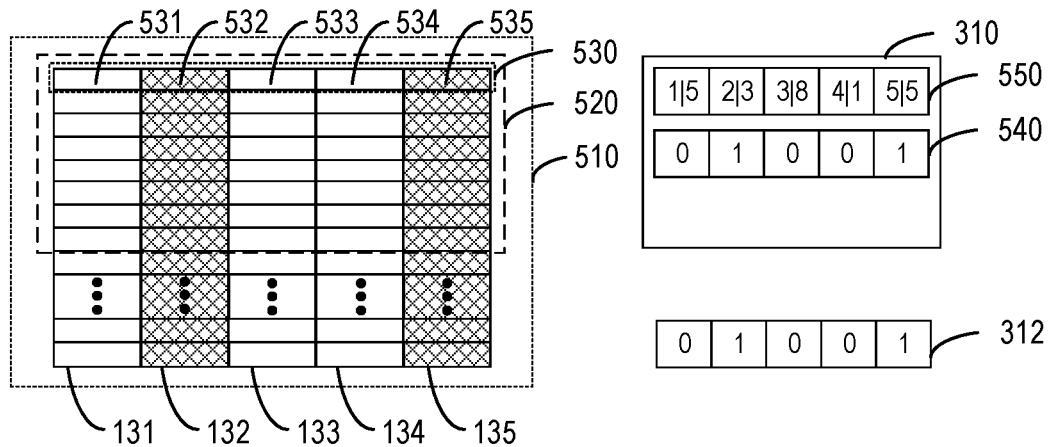
FIGS. 9A and 9B illustrate schematic diagrams of the RAID, the disk slice information and the second set of information bits under the RAID structure of FIG. 5 in accordance with embodiments of the present disclosure.

For example, FIG. 9A illustrates a schematic diagram of the RAID of a read request to be executed as well as the disk slice information 310 and the second set of information bits 312 thereof in accordance with embodiments of the present disclosure. The disk slice information 310 includes position information bits 550 and a first set of information bits 540. The value at the second and the fifth bits of the second set of information bits 312 is "1," which indicates that the disk slices 132 and 135 do not include valid data.

Return to FIG. 8, at block 804, a third set of extents including valid data and a fourth set of extents without any valid data in the second set of extents are determined, based on the second set of information bits. With reference to FIG. 9A, after the second set of extents (extents 531, 533 and 534 in the stripe 530) for executing the read request are determined based on the first set of information bits 540, the second set of information bits 312 are further detected, and a third set of extents (extents 531, 533 and 534 in the stripe 530) including valid data and a fourth set of extents (the fourth set of extents are empty in FIG. 9A, i.e., each extent in the second set of extents 531, 533 and 534 includes valid data) without any valid data in the second set of extents 531, 533 and 534 are determined.

Next, the read request is executed on the third set of extents without being executed on the fourth set of extents at block 806 of FIG. 8A. Therefore, the method 800 does not execute the read request on the disk slices without any valid data as well as the disk slices in the failure state.

The method 810 in FIG. 8B is introduced below. The method 810 starts from block 812, at which the third set of information bits are detected for the stripes in the RAID related to the read request.

As stated above, the third set of information bits indicate whether each disk slice in the RAID is in the new disk rebuild state. In the text, the new disk rebuild state is defined as: a disk slice fails and a new disk slice has already been allocated in the RAID, but the rebuild of the new disk slice is not yet completed. For example, when it is detected that a disk slice is in the failure state and a time period has passed, a new disk slice is automatically allocated to the RAID in the RRS. However, it costs a further time period to rebuild the newly allocated disk slice so as to e.g. recover data from other disk slices. During the further time period, the third set of information bits will indicate that the newly allocated disk slice is in the new disk rebuild state. After the rebuild of the newly allocated disk slice is completed, a value of the information bit, which previously indicated the new disk rebuild state, is reversed, so as to indicate that the disk slice is no longer in the new disk rebuild state. In some embodiments, it is impossible for the mapper to execute the read request normally on the disk slice in the new disk rebuild state, but the write request can be normally performed on the disk slice. This is due to the fact that the data can be written on the basis of a part of the disk slices which have been rebuilt during the rebuild of the new disk slice. In this situation, the mapper will perform the degraded stripe read request on the RAID.

Figure 9B:
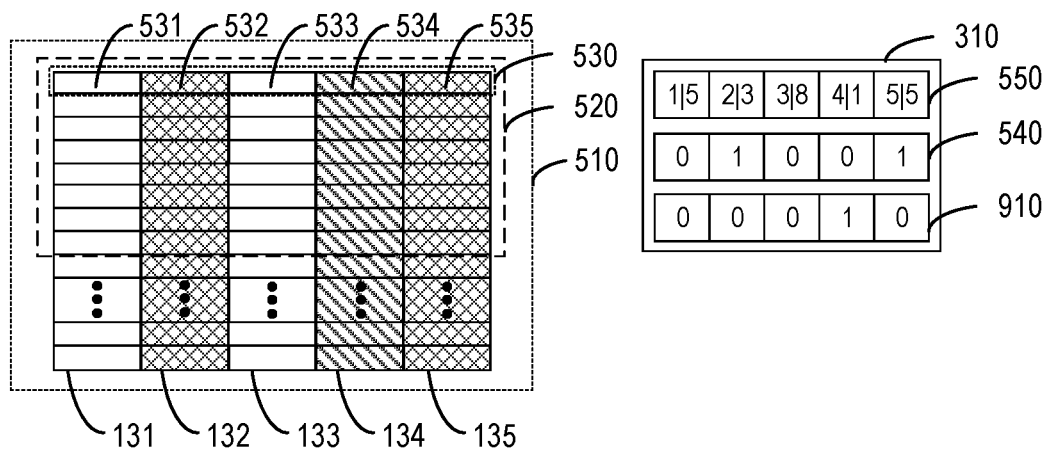

Now refer to FIG. 9B, which illustrates a schematic diagram of RAID of a read request to be executed and disk slice information 310 thereof in accordance with a further embodiment of the present disclosure. The disk slice information 310 includes the position information bits 550, the first set of information bits 540 and the third set of information bits 910. The value at the fourth bit of the third set of information bits 312 is "1," indicating that the disk slice 134 is in the new disk rebuild state.

Return to FIG. 8B, at block 814, a fifth set of extents in the new disk rebuild state and a sixth set of extents out of the new disk rebuild state in the second set of extents are determined, based on the third set of information bits. With reference to FIG. 9B, after the second set of extents (extents 531, 533 and 534 in the stripe 530) for executing the read request are determined based on the first set of information bits 540, the third set of information bits 910 are further detected, and a fifth set of extents (extent 534 in the stripe 530) in the new disk rebuild state and a sixth set of extents (extents 531 and 533 in the stripe 530) out of the new disk rebuild state are determined in the second set of extents 531, 533 and 534.

Subsequently, at block 816 of FIG. 8B, the read request is executed on the sixth set of extents without being executed on the fifth set of extents. Therefore, the method 810 does not execute the read request on the disk slices in the new disk rebuild state as well as the disk slices in the failure state.

In some preferred embodiments, the method 800 can be combined with the method 810, to simultaneously detect both the second set of information bits and the third set of information bits for the stripes in the RAID related to the read request. If a set of extents not including valid data or in the new disk rebuild state are determined in the second set of extents, the read request is executed on other extents in the second set of extents without being executed on this set of extents. In some embodiments, in response that a received I/O request is a read request, the first set of information bits, the second set of information bits and the third set of information bits can be detected simultaneously. If it is determined that the value of a logical OR operation on the above three sets of information bits of the disk slices where the extents are located in the stripe is "1" (i.e., any information bit among the first set of information bits, the second set of information bits and the third set of information bits corresponding to the disk slice is "1"), the read request is executed on other extents in the stripe without being executed on these extents.

The methods 800 and 810 implement the execution of the degraded stripe read request when the disk slices in the RAID, for example, are in the failure state, in the new disk rebuild state or do not include valid data.

The embodiments of executing the I/O request when the disk slices are in the failure state have been described above. In some cases, the disk slices in the failure state can also be replaced. For example, the disk slices in the failure state can be replaced after waiting a time period. In some embodiments, replacement of the disk slice can include allocating a new disk slice to the RAID in the RRS. In some embodiments, replacement of the disk slice can include removing a broken disk slice and returning a restored disk slice to the storage system. In some embodiments, replacement of the disk slice can include removing a broken disk slice and returning the disk slice to the storage system after firmware upgrade. In the following, returning the restored disk slice or the disk slice after firmware upgrade can be simply known as "returning an old disk slice."

Moreover, in some optional embodiments of the present disclosure, the multiple sets of information bits can also contain the above mentioned fourth set of information bits, in which each information bit indicates whether a disk slice of the I/O request to be executed is in the rebuild state. For example, when a broken disk slice is just replaced and not rebuilt yet, the corresponding information bit of the fourth set of information bits indicates that the disk slice in the rebuild state. In some embodiments, this can correspond to the above described two situations, i.e., allocating a new disk slice and returning an old disk slice. In accordance with the embodiments, when a new disk slice is allocated, the value of the third set of information bits is identical to that of the fourth set of information bits. After the disk slice is rebuilt, a value of the information bit, which previously indicated the rebuild state, is reversed, so as to indicate that the disk slice is out of the rebuild state. When the mapper executes the I/O request on the RAID, the related I/O control can also be realized by detecting the fourth set of information bits.

The improved solution for I/O control of the present disclosure achieves an optimized I/O control for the RAID built on the disk slices. Specifically, when a disk slice in the RAID fails, the improved solution of the present disclosure executes the degraded stripe I/O request more flexibly, using the disk slice information in the RAID and the opaque information transferred between the RAID and the processor instead of allocating a new disk slice immediately. Therefore, when a new disk slice cannot be allocated, the improved solution of the present disclosure can also normally execute the I/O request, including write request and read request. In addition, the disk slice information in the RAID is updated during the process of I/O control, which simplifies the storage of the information bits and avoids redundant information. Moreover, the processor which executes the I/O control is spared from the effort of parsing and modifying the opaque information, which improves the performance of the processor.

Figure 10:
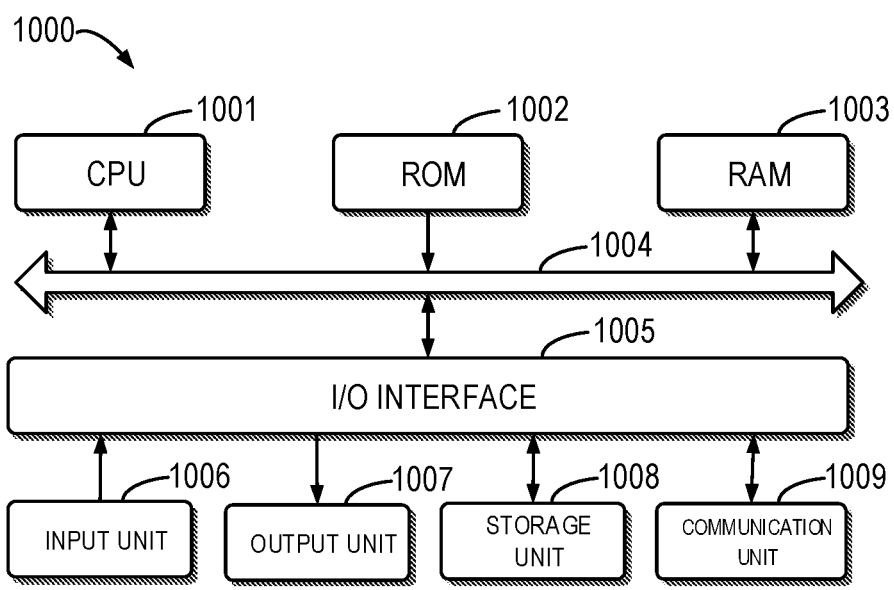
FIG. 10 illustrates a schematic block diagram of an example device for implementing embodiments of the present disclosure.

FIG. 10 illustrates a schematic block diagram of an example device 1000 for implementing embodiments of the present disclosure. The device 1000 can be implemented as the mapper 160 or a part thereof in FIG. 3. The device 1000 can be provided for performing the method 400 of FIG. 4, the method 600 of FIG. 6, the method 800 or FIG. 8A and/or the method 810 of FIG. 8B. According to the drawing, the device 1000 includes a central process unit (CPU) 1001, which can execute various actions and processing based on the computer program instructions stored in the read-only memory (ROM) 1002 or the computer program instructions loaded in the random-access memory (RAM) 1003 from the storage unit 1008. In the RAM 1003, it can also store all kinds of programs and data required by the operation of the device 1000. CPU 1001, ROM 1002 and RAM 1003 are connected to each other via a bus 1004. The input/output (I/O) interface 1005 is also connected to the bus 1004.

A plurality of components in the device 1000 is connected to the I/O interface 1005, including: an input unit 1006, such as keyboard, mouse and the like; an output unit 1007, e.g., various kinds of display and loudspeakers etc.; a storage unit 108, such as disk and optical disk etc.; and a communication unit 1009, such as network card, modem, wireless transceiver and the like. The communication unit 1009 allows the device 1000 to exchange information/data with other devices via the computer network, such as Internet, and/or various telecommunication networks.

The above described methods and processing, such as method 400, method 600, method 800 and/or method 810, can be executed by the processing unit 1001. For example, in some embodiments, the method 400, method 600, method 800 and/or method 810 can be implemented as a computer software program tangibly included in a machine-readable medium, e.g., a non-transitory computer readable medium, such as the storage unit 1008. In some embodiments, the computer program can be partially or fully loaded and/or mounted to the device 1000 via ROM 1002 and/or communication unit 1009. When the computer program is loaded to RAM 1003 and executed by the CPU 1001, one or more steps of the above described method 400, method 600, method 800 and/or method 810 can be implemented. Alternatively, in other embodiments, the CPU 1001 can be configured, via any other suitable ways (e.g., by means of firmware), to execute the method 400, method 600, method 800 and/or method 810.

Those skilled in the art should understand that each step of the above method of the present disclosure can be implemented by a general-purpose computing apparatus. They can be integrated on a single computing apparatus, or distributed on a network consisting of a plurality of computing apparatuses. Optionally, they can be implemented using the executable program codes of the computing apparatus, such that they are stored in the storage apparatus for the execution by the computing apparatus, or they are respectively manufactured into various integrated circuit assemblies, or multiple assemblies or steps in them are manufactured into a single integrated circuit assembly for implementation. Thus, the present disclosure is not restricted to any particular combinations of hardware and software.

It should be understood that, although the above detailed description mentions several apparatuses or sub-apparatuses of the device, the division is only by way of example rather than being compulsory. In fact, features and functions of the above described two or more apparatuses can be materialized in one apparatus according to the embodiments of the present disclosure. On the contrary, features and functions of the above described one apparatus can be further divided and materialized by several apparatuses.

The above description is only optional embodiments of the present disclosure, which does not restrict the present disclosure. For those skilled in the art, the present disclosure can have various modifications and alterations. Any amendments, equivalent substitutions, improvements and the like should be encompassed within the protection scope of the present disclosure as long as they are within the spirit and principle of the present disclosure.

We claim:

1. A method for I/O control, comprising the steps, performed for a write request, of:
   in response to receiving the write request, detecting a first set of information bits for a stripe in a Redundant Array of Independent Disks (RAID) related to the write request, the RAID being built on a plurality of disk slices divided from a plurality of disks, the stripe comprising a plurality of extents, and each of the first set of information bits indicating whether a disk slice where a corresponding extent in the stripe is located is in a failure state, the failure state being a condition in which a disk slice has failed but has not yet been replaced;
   determining, from the stripe and based on the first set of information bits, a first set of extents in the failure state and a second set of extents out of the failure state;
   based on the determining, and without allocating a new disk slice to replace a disk slice indicated to be in the failure state, executing the write request as a first degraded write request on the second set of extents without executing the first degraded write request on the first set of extents;
   detecting whether data of the first degraded write request is successfully written into the second set of extents; and
   in response to determining that the data of the first degraded write request fails to be written into one of the second set of extents:
   (1) updating the first set of information bits such that an information bit, which corresponds to a failed disk slice where the one extent in the failure state is located, is updated to indicate that the one extent is included in the first set of extents and not in the second set of extents; and
   (2) re-executing the write request as a second degraded write request based on the updated first set of information bits, the second degraded write request being executed on the second set of extents without executing the degraded write request on the first set of extents.

2. The method of claim 1, wherein the write request is followed by a read request executed as a degraded read request on the second set of extents by:
   detecting a second set of information bits for the stripe, each of the second set of information bits indicating whether a disk slice where a corresponding extent in the stripe is located includes valid data;
   determining, from the second set of extents and based on the second set of information bits, a third set of extents including the valid data and a fourth set of extents without any valid data; and
   executing the read request as a degraded read request on the third set of extents without executing the read request on the fourth set of extents.

3. The method of claim 2, wherein:
   the second set of information bits are determined based on whether data associated with the write request preceding the read request is successfully written into a disk slice.

4. The method of claim 1, wherein the write request is followed by a read request executed as a degraded read request on the second set of extents by:
   detecting a third set of information bits for the stripe, each of the third set of information bits indicating whether a disk slice where a corresponding extent in the stripe is located is in a new disk rebuild state;
   determining, from the second set of extents and based on the third set of information bits, a fifth set of extents in the new disk rebuild state and a sixth set of extents out of the new disk rebuild state; and
   executing the read request as a degraded read request on the sixth set of extents without executing the read request on the fifth set of extents.

5. The method of claim 2, wherein the second set of information bits are stored in mapper metadata after completion of the write request, and the stored second set of information bits are used in the execution of the read request so as not to perform the read request on disk slices without any valid data.

6. An apparatus for I/O control, comprising:
a processor; and
a memory coupled to the processor and having instructions stored thereon, the instructions, when executed by the processor, causing the apparatus to perform acts for a write request comprising:
in response to receiving a-the write request, detecting a first set of information bits for a stripe in a Redundant Array of Independent Disks (RAID) related to the write request, the RAID being built on a plurality of disk slices divided from a plurality of disks, the stripe comprising a plurality of extents, and each of the first set of information bits indicating whether a disk slice where a corresponding extent in the stripe is located is in a failure state, the failure state being a condition in which a disk slice has failed but has not yet been replaced;
determining, from the stripe and based on the first set of information bits, a first set of extents in the failure state and a second set of extents out of the failure state;
based on the determining, and without allocating a new disk slice to replace a disk slice indicated to be in the failure state, executing the write request as a first degraded write request on the second set of extents without executing the first degraded write request on the first set of extents;
detecting whether data of the first degraded write request is successfully written into the second set of extents; and
in response to determining that the data of the first degraded write request fails to be written into one of the second set of extents:
(1) updating the first set of information bits such that an information bit, which corresponds to a failed disk slice where the one extent in the failure state is located, is updated to indicate that the one extent is included in the first set of extents and not in the second set of extents; and
(2) re-executing the write request as a second degraded write request based on the updated first set of information bits, the second degraded write request being executed on the second set of extents without executing the degraded write request on the first set of extents.

7. The apparatus of claim 6, wherein the write request is followed by a read request executed as a degraded read request by:
detecting a second set of information bits for the stripe, each of the second set of information bits indicating whether a disk slice where a corresponding extent in the stripe is located includes valid data;
determining, from the second set of extents and based on the second set of information bits, a third set of extents including the valid data and a fourth set of extents without any valid data; and
executing the read request as a degraded read request on the third set of extents without executing the read request on the fourth set of extents.

8. The apparatus of claim 7, wherein:
the second set of information bits are determined based on whether data associated with the write request preceding the read request is successfully written into a disk slice.

9. The apparatus of claim 6, wherein the write request is followed by a read request executed as a degraded read request on the second set of extents by:
detecting a third set of information bits for the stripe, each of the third set of information bits indicating whether a disk slice where a corresponding extent in the stripe is located is in a new disk rebuild state;
determining, from the second set of extents and based on the third set of information bits, a fifth set of extents in the new disk rebuild state and a sixth set of extents out of the new disk rebuild state; and
executing the read request as a degraded read request on the sixth set of extents without executing the read request on the fifth set of extents.

10. A non-transitory computer-readable medium having computer-readable instructions stored thereon, the computer-readable instructions, when executed, causing a device to perform acts for a write request including:
in response to receiving the write request, detecting a first set of information bits for a stripe in a Redundant Array of Independent Disks (RAID) related to the write request, the RAID being built on a plurality of disk slices divided from a plurality of disks, the stripe comprising a plurality of extents, and each of the first set of information bits indicating whether a disk slice where a corresponding extent in the stripe is located is in a failure state, the failure state being a condition in which a disk slice has failed but has not yet been replaced;
determining from the stripe and based on the first set of information bits, a first set of extents in the failure state and a second set of extents out of the failure state;
based on the determining, and without allocating a new disk slice to replace a disk slice indicated to be in the failure state, executing the write request as a first degraded write request on the second set of extents without executing the first degraded write request on the first set of extents;
detecting whether data of the first degraded write request is successfully written into the second set of extents; and
in response to determining that the data of the first degraded write request fails to be written into one of the second set of extents:
(1) updating the first set of information bits such that an information bit, which corresponds to a failed disk slice where the one extent in the failure state is located, is updated to indicate that the one extent is included in the first set of extents and not in the second set of extents; and
(2) re-executing the write request as a second degraded write request based on the updated first set of information bits, the second degraded write request being executed on the second set of extents without executing the degraded write request on the first set of extents.

11. The non-transitory computer-readable medium of claim 10, wherein the write request is followed by a read request, and the computer-readable instructions, when executed, cause the device to execute the read request as a degraded read request by:
detecting a second set of information bits for the stripe, each of the second set of information bits indicating whether a disk slice where a corresponding extent in the stripe is located includes valid data;
determining, from the second set of extents and based on the second set of information bits, a third set of extents including the valid data and a fourth set of extents without any valid data; and executing the read request as a degraded read request on the third set of extents without executing the read request on the fourth set of extents.

12. The non-transitory computer-readable medium of claim 11, wherein:

the second set of information bits are determined based on whether data associated with the write request preceding the read request is successfully written into a disk slice.

13. The non-transitory computer-readable medium of claim 10, wherein the write request is followed by a read request, and the computer-readable instructions, when executed, cause the device to execute the read request as a degraded read request by:

detecting a third set of information bits for the stripe, wherein each of the third set of information bits indicating whether a disk slice where a corresponding extent in the stripe is located is in a new disk rebuild state;

determining, from the second set of extents and based on the third set of information bits, a fifth set of extents in the new disk rebuild state and a sixth set of extents out of the new disk rebuild state; and executing the read request as a degraded read request on the sixth set of extents without executing the read request on the fifth set of extents.

* * * * *

UNITED STATES PATENT AND TRADEMARK OFFICE
CERTIFICATE OF CORRECTION

| | |
|---|---|
| PATENT NO. | : 11,507,461 B2 |
| APPLICATION NO. | : 16/587970 |
| DATED | : November 22, 2022 |
| INVENTOR(S) | : Geng Han, Jianbin Kang and Jibing Dong |

It is certified that error appears in the above-identified patent and that said Letters Patent is hereby corrected as shown below:

In the Claims

In Claim 6, Column 19, Line 10, "in response to receiving a-the write request," should read
-- in response to receiving the write request, --.

Signed and Sealed this
Twenty-fourth Day of January, 2023

Katherine Kelly Vidal
*Director of the United States Patent and Trademark Office*